United States Patent
Wood et al.

(10) Patent No.: US 12,228,053 B1
(45) Date of Patent: Feb. 18, 2025

(54) TURBOFAN ENGINE INCLUDING INTEGRATED PYLON AND FAN OUTLET GUIDE VANE WITH NOISE REDUCTION FEATURES

(71) Applicant: General Electric Company, Schenectady, NY (US)

(72) Inventors: Trevor H. Wood, Clifton Park, NY (US); Kishore Ramakrishnan, Rexford, NY (US); Egbert Geertsema, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 18/232,026

(22) Filed: Aug. 9, 2023

(51) Int. Cl.
*F01D 9/04* (2006.01)
*F02C 7/24* (2006.01)

(52) U.S. Cl.
CPC .............. *F01D 9/041* (2013.01); *F02C 7/24* (2013.01); *F05D 2240/12* (2013.01); *F05D 2260/96* (2013.01)

(58) Field of Classification Search
CPC ........................................................ F01D 9/041
See application file for complete search history.

(56) References Cited

U.S. PATENT DOCUMENTS

| | | |
|---|---|---|
| 8,221,071 B2 | 7/2012 | Wojno |
| 9,540,938 B2 | 1/2017 | Topol |
| 9,932,842 B2 | 4/2018 | Hyatt |
| 10,087,843 B2 | 10/2018 | Budnick |
| 10,247,018 B2 | 4/2019 | Topol |
| 10,556,699 B2 | 2/2020 | Pautis |

(Continued)

FOREIGN PATENT DOCUMENTS

| | | |
|---|---|---|
| FR | 3127024 | 3/2023 |
| FR | 3127025 | 3/2023 |

(Continued)

OTHER PUBLICATIONS

Pending U.S. Appl. No. 17/828,112, filed May 24, 2022, entitled "Cut-on fan aeroacoustics concepts with acoustic penalty avoidance,".

(Continued)

*Primary Examiner* — Brian O Peters
(74) *Attorney, Agent, or Firm* — Fitch, Even, Tabin & Flannery LLP

(57) ABSTRACT

A turbofan engine and an outlet guide vane structure for the turbofan engine is provided. The outlet guide vane structure includes a non-uniform plurality of outlet guide vanes utilized in a bypass duct and between a radially inward wall and a radially outward wall. The non-uniform plurality of outlet guide vanes have varying chord lengths at the base of the outlet guide vanes along the radially inward wall. The non-uniform plurality of outlet guide vanes may include structural outlet guide vanes, non-structural outlet guide vanes, and cut-out outlet guide vanes. The non-uniform plurality of outlet guide vanes include at least one outlet guide vane integrated with a pylon and/or a bifurcation of the turbofan engine. The cut-out outlet guide vane may be integrated with the pylon and/or bifurcation. The cut-out may include a leading edge and a trailing edge disposed in front of a leading edge of the pylon.

20 Claims, 11 Drawing Sheets

(56) References Cited

U.S. PATENT DOCUMENTS

| | | | |
|---|---|---|---|
| 11,255,343 | B2 | 2/2022 | Wood |
| 11,448,236 | B2 | 9/2022 | Klumpp |
| 2020/0024986 | A1* | 1/2020 | Di Mare ................. F01D 9/041 |
| 2022/0049621 | A1 | 2/2022 | Sawyers-Abbott |

FOREIGN PATENT DOCUMENTS

| | | | | |
|---|---|---|---|---|
| FR | 3127269 | | 3/2023 | |
| FR | 3129375 | | 5/2023 | |
| FR | 3129428 | | 5/2023 | |
| FR | 3129432 | | 5/2023 | |
| FR | 3129436 | | 5/2023 | |
| FR | 3129690 | | 6/2023 | |
| FR | 3129970 | | 6/2023 | |
| FR | 3129972 | | 6/2023 | |
| FR | 3130313 | | 6/2023 | |
| FR | 3130323 | | 6/2023 | |
| FR | 3130747 | | 6/2023 | |
| FR | 3130874 | | 6/2023 | |
| FR | 3130875 | | 6/2023 | |
| FR | 3130877 | | 6/2023 | |
| FR | 3130879 | | 6/2023 | |
| FR | 3130894 | | 6/2023 | |
| FR | 3130895 | | 6/2023 | |
| FR | 3130896 | | 6/2023 | |
| FR | 3130897 | | 6/2023 | |
| FR | 3132279 | | 8/2023 | |
| FR | 3132729 | | 8/2023 | |
| FR | 3132743 | | 8/2023 | |
| FR | 3133367 | | 9/2023 | |
| FR | 3133368 | | 9/2023 | |
| GB | 551882 | | 3/1943 | |
| GB | 2471845 | * | 1/2011 | |
| GB | 2471845 A | * | 1/2011 | ........... F01D 17/162 |
| WO | 2022152994 | | 7/2022 | |

OTHER PUBLICATIONS

Richard P. Woodward, et al., "Benefits of Swept-and-Leaned Stators for Fan Noise Reduction", Journal of Aricraft, vol. 38, No. 6, Nov.-Dec. 2001; NASA John H. Glenn Research Center at Lewis Field; 11 pgs.

* cited by examiner

TURBOFAN ENGINE INCLUDING INTEGRATED PYLON AND FAN OUTLET GUIDE VANE WITH NOISE REDUCTION FEATURES

TECHNICAL FIELD

The present subject matter relates generally to a turbofan engine including fan outlet guide vanes integrated with a pylon for noise reduction.

BACKGROUND

Outlet guide vanes are utilized in turbofan engines. The outlet guide vanes may be placed in a bypass duct, downstream from a fan section of the turbofan engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
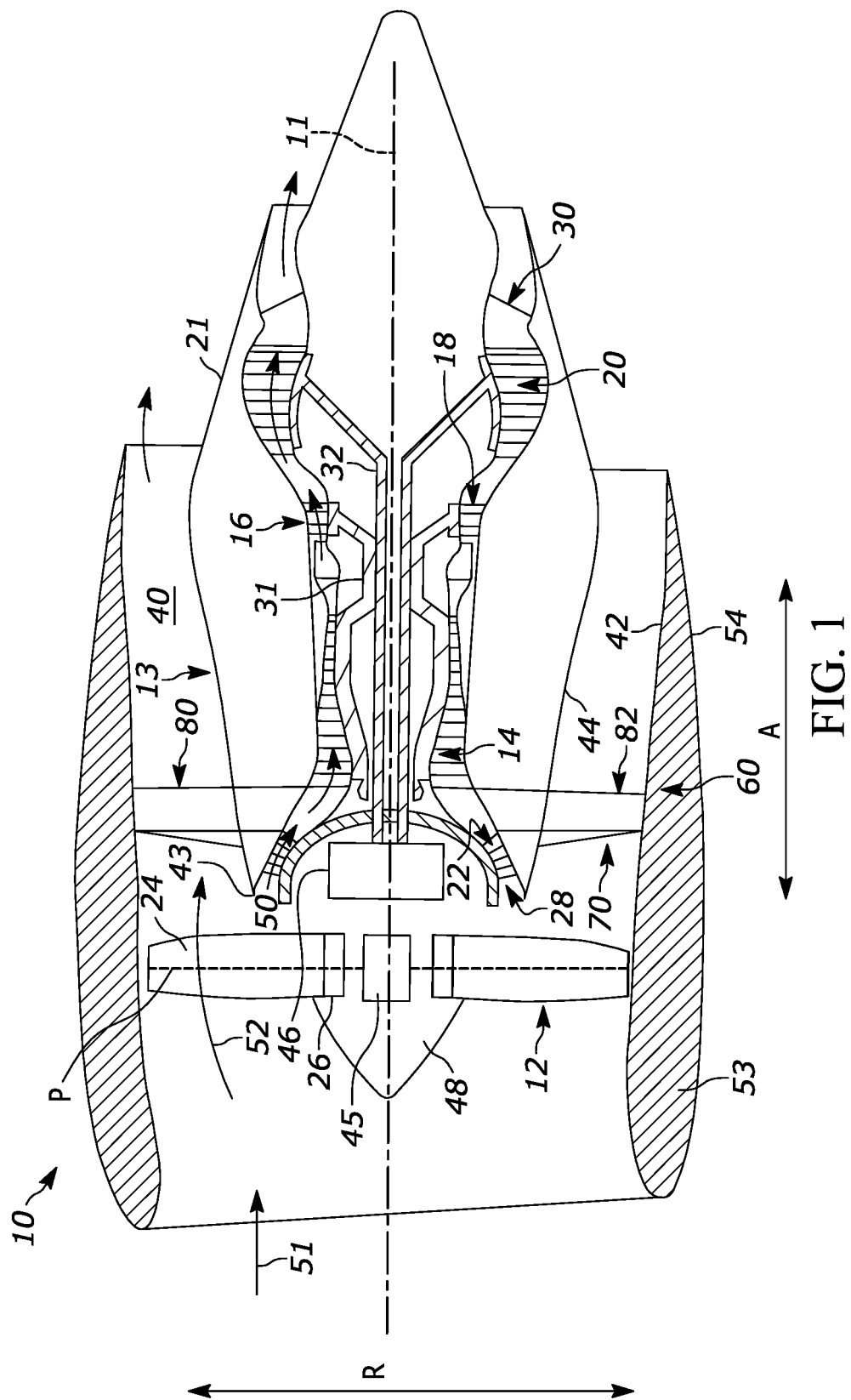
FIG. 1 is a cross-sectional view of a turbofan engine.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," and "third" may be used interchangeably to distinguish one component from another and are not intended to signify location or importance of the individual components.

The terms "coupled," "fixed," "attached to," "integrated," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, the present subject matter relates to a plurality of non-uniform outlet guide vanes disposed within a turbofan engine. The outlet guide vanes are generally circumferentially spaced on an annulus within the turbofan engine. The plurality of non-uniform outlet guide vanes, also referred to more generally as outlet guide vanes, a guide vane assembly, or exit guide vanes, are provided for reducing noise, and/or improving efficiency as compared to known turbofan engine designs while maintaining mechanical strength of the turbofan engine. The plurality of non-uniform outlet guide vanes may also be used to redirect the airflow of a bypass stream created by and/or coming from a fan section of the turbofan engine placed upstream of the outlet guide vanes in such a way as to provide additional engine thrust for the aircraft. In doing so, the plurality of fan wakes impinge on the outlet guide vanes (OGVs) in an unsteady aerodynamic interaction that generates undesirable noise. Increasing a leading edge sweep angle of the outlet guide vanes is a well-known way to reduce this fan-OGV interaction noise.

The plurality of non-uniform outlet guide vanes includes one or more structural guide vanes. The one or more structural guide vanes are coupled to a pylon and/or a bifurcation of the turbofan engine. The pylon and/or bifurcation are utilized to couple the turbofan engine onto an aircraft. In some embodiments the plurality of non-uniform outlet guide vanes may additionally or alternatively include one or more outlet guide vanes including a cut-out integrally coupled to either the pylon and/or bifurcation. The outlet guide vanes may be used to redirect the airflow emanating from a fan section upstream of the outlet guide vanes around the pylon and/or bifurcation leading to increased aerodynamic efficiency and reduced noise.

As used herein, a pylon and a bifurcation are used to refer to a strut or structural element of a turbofan engine coupling the turbofan engine onto the aircraft. The pylon and bifurcations are similar in structure and function in terms of their use in a turbofan engine and are accordingly referred to as a single pylon. However, the present disclosure contemplates a turbofan engine including a single pylon, a single bifurcation, a pylon and a bifurcation, and more than two pylons/bifurcations. Additionally, as illustrated, the pylon and bifurcation are located at the top and bottom of the turbofan engine, however, the present disclosure contemplates the pylon and/or bifurcation being located anywhere on the turbofan engine and additionally contemplates the pylon and bifurcation being non-opposed as compared to one another.

In some embodiments, the plurality of non-uniform outlet guide vanes described herein provide for improved efficiency of the turbofan engine by utilizing non-structural outlet guide vanes for the outlet guide vanes not integrally coupled to the pylon or bifurcation. Utilizing structural outlet guide vanes integrally coupled to the pylon and non-structural outlet guide vanes for the remainder of the plurality of non-uniform outlet guide vanes allows for improved efficiency of the turbofan engine by allowing for the more efficient non-structural vanes to be used for a majority of the plurality of non-uniform outlet guide vanes and minimizing losses associated with the one or more structural outlet guide vanes. Similarly, using a cut-out outlet guide vane integrally coupled to the pylon may provide additional efficiency by reducing skin friction losses. The plurality of non-uniform outlet guide vanes may have different chord lengths for the outlet guide vanes. In some embodiments, the structural outlet guide vanes have a longer chord length than the remainder of the plurality of non-uniform outlet guide vanes.

Additionally, utilizing the plurality of non-uniform outlet guide vanes described herein may maintain the mechanical strength of the turbofan engine. To maintain load bearing capability of the engine, a radial load path is desirable for the structural guide vanes. However, when the leading edge is swept for noise reduction, aerodynamic efficiency may be compromised if the chord is increased to maintain a substantially radial trailing edge that is integrated with the pylon or bifurcation. In some embodiments, by having a cut out in the structural guide vanes, excess chord and skin friction losses are reduced. Thus, embodiments of the present invention maintain the mechanical strength of the engine while minimizing noise and increasing efficiency. This may be done concurrently while reducing noise and improving efficiency. Maintaining the mechanical strength of the turbofan engine by utilizing the plurality of non-uniform outlet guide vanes may be achieved by the structural guide vane having a mechanical load line which increases an outlet guide vane chord length, which in turn increases the mechanical load the outlet guide vane is capable of supporting. This may be done by having a highly swept leading edge of the plurality of non-uniform outlet guide vanes which, as described above, having increased efficiency and/or noise reduction.

In some embodiments, an outlet guide vane including a cut-out may be utilized. The cut-out outlet guide vane, as described herein, may integrally couple to a pylon and/or bifurcation. The cut-out outlet guide vane may additionally or alternatively have structural outlet guide vanes placed adjacent to the integrated cut-out outlet guide vane to provide additional mechanical strength.

In some embodiments, a cut-out outlet guide vane described herein may include a cut-out having a radial length of approximately 50% of the guide vanes radial length measured from a base of the cut-out outlet guide vane along an inner cowl of a nacelle. The cut-out may provide additional efficiency due to a reduced length of material of the outlet guide vane along the inner cowl of a nacelle, also referred to as chord length. Additionally or alternatively, the cut-out may provide additional efficiency due to a reduced surface area of material of the outlet guide vane for increased aerodynamic efficiency in redirecting the fan flow. The present disclosure contemplates the cut-out outlet guide vane having less material along the inner cowl and/or the inboard spanwise portion of the vane to enable reduced noise, improved efficiency, and structural durability of the turbofan engine.

In some embodiments, the cut-out outlet guide vane described herein may include a cut-out having a radial length of 1% to 99% of the guide vane radial length. The cut-out may provide increased efficiency and increased noise reduction. The cut-out having a varying radial length allows for use in various different turbofan engines, specifically different fan section configurations and/or different pylon or bifurcation configurations.

In some embodiments, the outlet guide vane described herein may include a sweep of the outlet guide vane. The sweep of the outlet guide vane may be defined as the angle of a leading edge of the guide vane from a constant axial plane. The outlet guide vane sweep is constrained on a tip side by a tip location of the pylon and the aerodynamically required chord length for the OGV, and on a hub side by a splitter of the turbofan engine where an initial air flow is split between an outer air flow and an inner air flow. Increased noise reduction may be provided by having an increased sweep of the outlet guide vane. For OGVs including increased sweep which include mechanical loads, mechanical strength may be compromised if the chord length of the OGV along the hub is not sufficiently increased to maintain radial stiffness for load bearing vanes. The sweep having a spanwise varying chord length allows for use in various different turbofan engines, specifically different fan section configurations and/or different pylon or bifurcation configurations. Additionally, the outlet guide vane may include a different level of sweep at the top of the outlet guide vane. In one embodiment, this sweep may be referred to as a reverse or forward sweep at the top of the outlet guide vane as the outlet guide vane sweeps toward the fan section upstream of the outlet guide vane at a radially outward wall of a bypass duct section.

In some embodiments, the cut-out outlet guide vane described herein may include a lean of the cut-out outlet guide vane at the base of the vane attached to the inner cowl of the nacelle. The lean may extend in the circumferential direction. The lean may be utilized to allow for the benefits of the cut-out outlet guide vane described herein while providing additional protection of a secondary wake occurring from the cut-out and impacting the pylon.

In some embodiments, the outlet guide vanes described herein may include a liner disposed within, coupled to, or integrally formed with the outlet guide vanes. The liners may include different material and/or different textured or grooved (e.g., riblet) surfaces to provide additional noise reduction or increased efficiency.

Referring now to the drawings, wherein identical numerals indicate the same elements throughout the figures, FIG.

1 is a cross-sectional view of an exemplary turbine engine. The turbine engine is a high-bypass turbofan jet engine, referred to herein as "turbofan engine 10." The turbofan engine 10 defines an axial direction A (extending parallel to a longitudinal centerline 11 provided for reference) and a radial direction R. In general, the turbofan engine 10 includes a fan assembly 12 and a core turbine engine 13 disposed downstream from the fan assembly 12.

The core turbine engine 13 depicted generally includes a substantially tubular outer casing 21 that defines an annular inlet 28. As schematically shown in FIG. 1, the tubular outer casing 21 encases, in serial flow relationship, a compressor section including a low pressure (LP) compressor 22 and a high pressure (HP) compressor 14; a combustion section 16; a turbine section including a high pressure (HP) turbine 18 and a low pressure (LP) turbine 20; and a jet exhaust section 30. A high pressure (HP) shaft or spool 32 drivingly connects the HP turbine 18 to the HP compressor 14 to rotates the HP turbine 18 and the HP compressor 14 in unison. A low pressure (LP) spool 31 drivingly connects the LP turbine 20 to the LP compressor 22 to rotate the LP turbine 20 and the LP compressor 22 in unison. The compressor section, the combustion section 16, the turbine section, and the jet exhaust nozzle section 30 together define a core air flow path. The fan assembly 12 includes an array of fan blades 24 extending radially outward from a rotor disk 26.

For the embodiment depicted in FIG. 1, the fan section includes a fan assembly 12 (e.g., a variable pitch fan) having a plurality of fan blades 24 coupled to a rotor disk 26 in a spaced apart manner. As depicted in FIG. 1, the fan blades 24 extend outwardly from the rotor disk 26 generally along the radial direction R. Each fan blade 24 is rotatable relative to the rotor disk 26 about a pitch axis P by virtue of the fan blades 24 being operatively coupled to an actuation member 45 configured to collectively vary the pitch of the fan blades 24 in unison. The fan blades 24, the rotor disk 26, and the actuation member 45 are together rotatable about the longitudinal centerline axis 11 via a fan shaft that is powered by the LP spool 31 across a power gearbox, also referred to as a gearbox assembly 46. The gearbox assembly 46 is shown schematically in FIG. 1. The gearbox assembly 46 includes a plurality of gears for adjusting the rotational speed of the fan shaft and, thus, the fan assembly 12 relative to the LP spool 31.

Referring still to the exemplary embodiment of FIG. 1, the rotor disk 26 is covered by a rotatable fan hub 48 aerodynamically contoured to promote an airflow through the plurality of fan blades 24. In addition, the fan section includes an annular fan casing or a nacelle 53 that circumferentially surrounds the fan assembly 12 and/or at least a portion of the core turbine engine 13. The nacelle 53 is supported relative to the core turbine engine 13 by a plurality of outlet guide vanes 70 that is spaced circumferentially about the nacelle 53. Moreover, a downstream section 54 of the nacelle 53 extends over an outer portion of the core turbine engine 13 to define a bypass airflow duct 40 therebetween.

In operation, a volume of air 51 flows through the fan assembly 12 and a first portion 50 of the airflow is channeled through the LP compressor 22. The compressed air that is discharged from the LP compressor 22 is channeled through the HP compressor 14 wherein the airflow is further compressed and delivered to the combustion section 16. Hot products of combustion (not shown in FIG. 1) from the combustion section 16 are utilized to drive the HP and LP turbines 18 and 20, and the LP turbine 20 is utilized to drive fan assembly 12 and the LP compressor 22 by way of the LP spool 31, and optionally driven through a gearbox. The turbofan engine 10 is operable at a range of operating conditions between design operating conditions and off-design operating conditions.

A second portion 52 of the airflow discharged from the fan assembly 12 is channeled through a bypass duct 40 to bypass a portion of the airflow from the fan assembly 12 around the core turbine engine 13. More specifically, the bypass duct 40 extends between a radially outward wall 42 of a casing and a radially inward wall 44 of the turbofan engine 10. The radially inward wall 44 may include a splitter 43, or a location where the radially inward wall 44 and an outer wall of the core turbine engine 13 meet. Accordingly, a first portion 50 of the airflow from the fan assembly 12 is channeled through LP compressor 22 and then into the HP compressor 14 as described above, and a second portion 52 of the airflow from the fan assembly 12 is channeled through the bypass duct 40 to provide thrust for an aircraft, for example. The turbofan engine 10 also includes a fan frame assembly 60 to provide structural support for the fan assembly 12 and is also utilized to couple the fan assembly 12 to the core turbine engine 13.

The fan frame assembly 60 includes a plurality of outlet guide vanes 70 that typically extend substantially radially, between a radially-outer mounting flange and a radially-inner mounting platform, and are circumferentially-spaced within bypass duct 40. The fan frame assembly 60 may also include a plurality of struts that are coupled between a radially outer mounting platform and a radially inner mounting flange. In one embodiment, the fan frame assembly 60 is fabricated in arcuate segments in which flanges are coupled to outlet guide vanes 70 and struts. In one embodiment, the outlet guide vanes and struts are coupled coaxially within bypass duct 40. Optionally, the outlet guide vanes 70 may be coupled upstream or downstream from struts within bypass duct 40. The outlet guide vanes 70 serve to turn the airflow, in some instances a swirling airflow, downstream from the rotating fan blades 24 toward the axial direction L. The outlet guide vanes may extend from the radially outward wall 42 to the radially inward wall 44 of the turbofan engine 10.

The fan frame assembly 60 is one of various frame and support assemblies of the turbofan engine 10 that are used to facilitate maintaining an orientation of various components within the turbofan engine 10. More specifically, such frame and support assemblies interconnect stationary components and provide rotor bearing supports. The fan frame assembly 60 is coupled downstream from the fan assembly 12 within the bypass duct 40 such that the outlet guide vanes 70 and struts are circumferentially-spaced around the outlet of the fan assembly 12 and extend across the airflow path discharged from the fan assembly 12.

Additionally, FIG. 1 illustrates a pylon 80 and/or bifurcation 82 which extend radially through the bypass duct 40 between the radially outward wall 42 and radially inward wall 44 of the turbofan engine 10. The configuration of the pylon 80 and/or bifurcation 82 will be described in greater detail hereafter. While the figures herein illustrate two (an upper pylon 80 and a lower bifurcation 82) it is possible that for certain configurations (including certain engine mounting arrangements) that one or more pylons and/or bifurcations may be utilized, including utilizing the pylons and bifurcations at any suitable location around the circumference of the turbofan engine 10.

It should be appreciated, however, that the exemplary turbofan engine 10 depicted in FIG. 1 is by way of example only, and that in other exemplary embodiments, aspects of the present disclosure may additionally, or alternatively, be applied to any other suitable turbine engine. For example, in other exemplary embodiments, the turbofan engine 10 may instead be any other suitable aeronautical turbine engine, such as a turbojet engine, turboshaft engine, turboprop engine, etc. Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2:
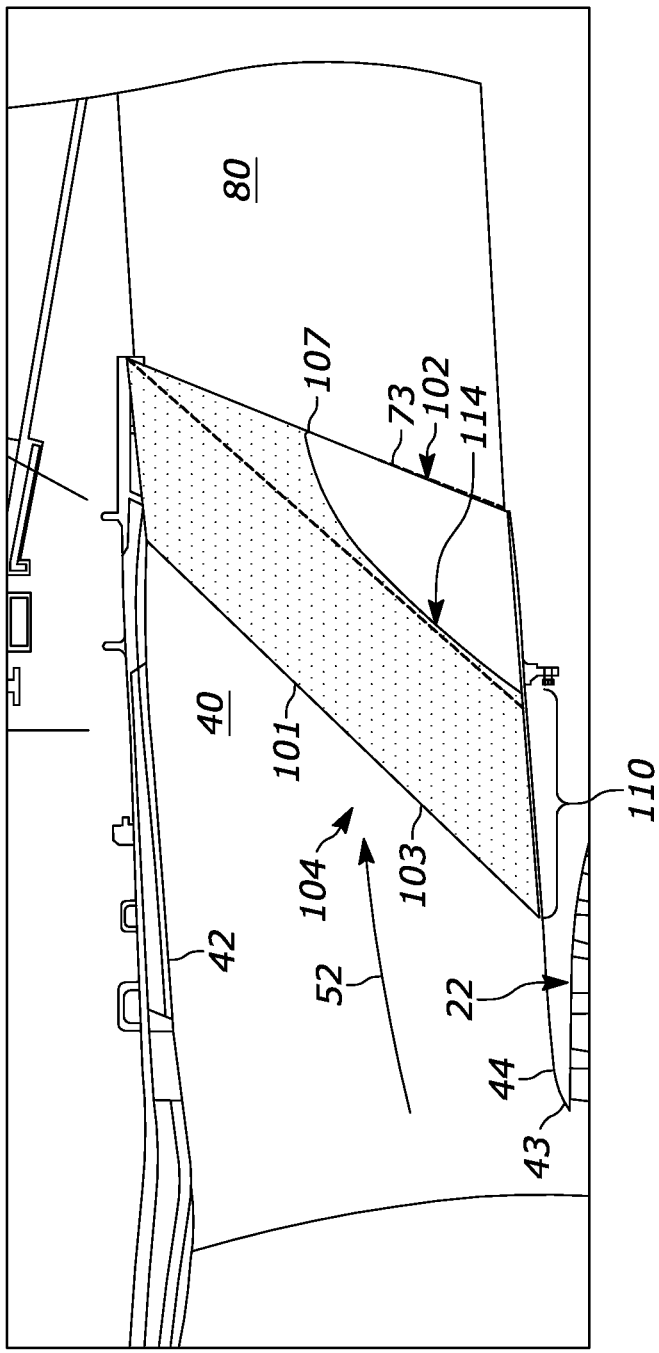
FIG. 2 is an elevational partial cross-sectional view of the turbofan engine shown in FIG. 1 including an outlet guide vane according to some embodiments.

As shown in FIG. 2, a cut-out outlet guide vane 101 integrated with a pylon 80 is illustrated. As the second portion 52 of air enters the bypass duct 40, of the turbofan engine 10, the air contacts a leading edge 103 of the cut-out outlet guide vane 101. The cut-out outlet guide vane 101 includes a cut-out 102 extending from the radially inward wall 44 toward the radially outward wall 42. The cut-out outlet guide vane 101 is integrally formed with the pylon 80 at a trailing edge 73 of the cut-out outlet guide vane 101. The cut-out 102 includes an integrated extent of its radial length and a cut-out extent along the radial length of the cut-out outlet guide vane 101 at the trailing edge 73, the cut-out extent and the integrated extent meet at a conjunction 107. The cut-out 102 is disposed at the base of the cut-out outlet guide vane 101 and extends radially outward from the base of the cut-out outlet guide vane 101, adjacent the radially inward wall 44, towards the radially outward wall 42 of the bypass duct 40. The cut-out 102 extends axially from the pylon 80, at the trailing edge 73 of the cut-out outlet guide vane 101 towards the splitter 43.

The length of the cut-out 102 may be defined as the cut-out extent of the cut-out outlet guide vane 101. The length of the cut-out 102 ranges from 1% to 99% of the radial length of the cut-out outlet guide vane 101 at the trailing edge 73, i.e., the conjunction 107 may be from 1% to 99% of the radial length of the cut-out outlet guide vane 101. In some configurations, the cut-out extends about 10% to 90% of the radial length of the cut-out outlet guide vane 101. In one embodiment, the length of the cut-out 102 is about 50% of the radial length of the cut-out outlet guide vane 101 measured from the radially inward wall 44 towards the radially outward wall 42. By providing the cut-out 102 of the cut-out outlet guide vane 101 integrated with the pylon 80, a chord length 110 of the cut-out outlet guide vane 101 can be reduced. The chord length 110 is defined as the length between the leading edge 103 and the trailing edge 73 of the cut-out outlet guide vane 101. Additionally, the cut-out outlet guide vane 101 includes a sweep 104. The sweep 104, as illustrated, may be substantially constant. In some embodiments, discussed below, the sweep 104 may be varied, e.g., curved. The sweep 104 may additionally affect the chord length 110 of the guide vane, and in this instance, the cut-out outlet guide vane 101. The sweep 104 may provide the benefits outlined herein. By incorporating the cut-out 102 and the sweep 104, the amount of material of the cut-out outlet guide vane 101 at the radially inward wall 44 is reduced. By reducing the chord length 110, the noise reduction benefit of a swept leading edge can be maintained while increasing the efficiency and maintaining mechanical stiffness.

Figure 3:
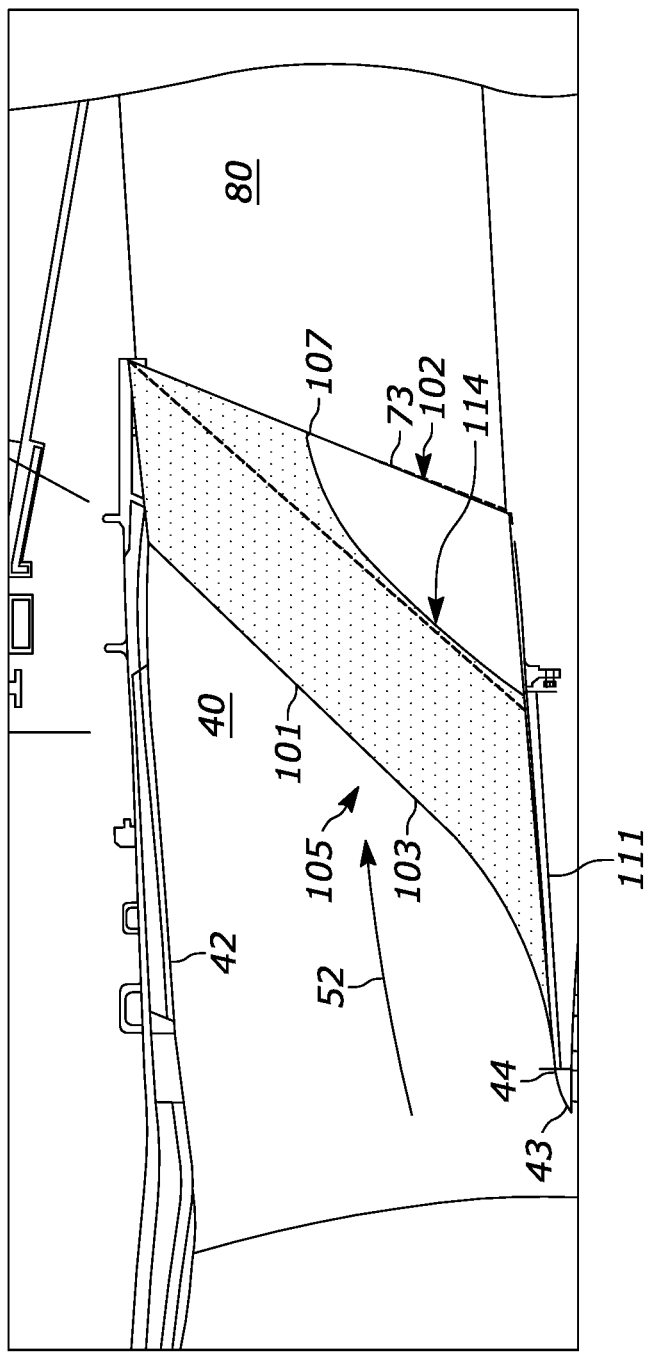
FIG. 3 is an elevational partial cross-sectional view of the turbofan engine shown in FIG. 1 including an outlet guide vane according to some embodiments.

In FIG. 3, a second embodiment of a cut-out outlet guide vane 101 is illustrated. The cut-out outlet guide vane 101 in FIG. 3 includes a leading edge 105 including a curved sweep and is integrated with the pylon 80. The leading edge 105 may additionally extend along the radially inward wall 44 to a splitter 43. The splitter 43 is the location where the first portion 50 (FIG. 1) and the second portion 52 of air split. In some embodiments, the leading edge 105 being curved and/or extending to the splitter 43 increases a chord length 111 of the cut-out outlet guide vane 101 which may decrease efficiency benefits while providing additional noise reduction. In one embodiment, the leading edge 105 extends between 1% to 100% from the splitter 43 to the leading edge of the pylon 80. Additionally, having the leading edge 105 being curved and/or extending to the splitter 43 used in conjunction with the cut-out 102 may allow for embodiments where the chord length is substantially the same as known integrated outlet guide vanes. In these instances, the efficiency of the cut-out outlet guide vane 101 may be approximately the same as compared to the known integrated outlet guide vanes, however, as noted above, there may be additional noise reduction for these cut-out outlet guide vanes 101.

Figure 4A:
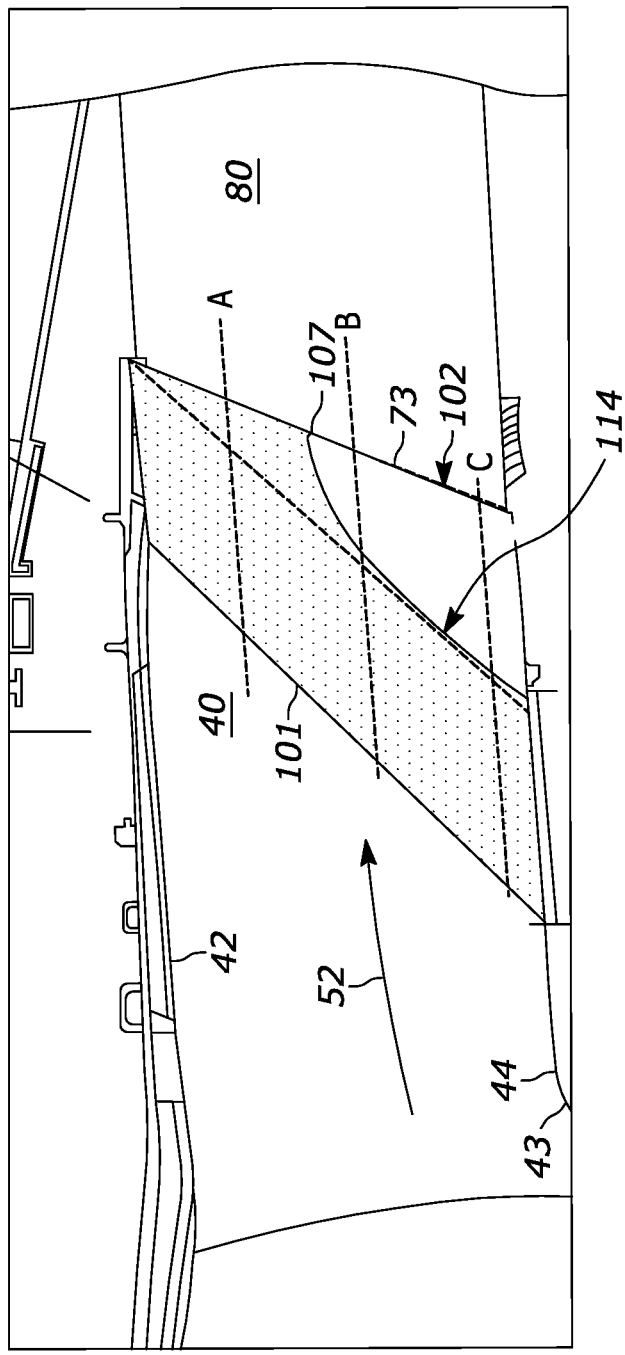
FIG. 4A is an elevational partial cross-sectional view of the turbofan engine shown in FIG. 1 including an outlet guide vane according to some embodiments.
Figure 4B:
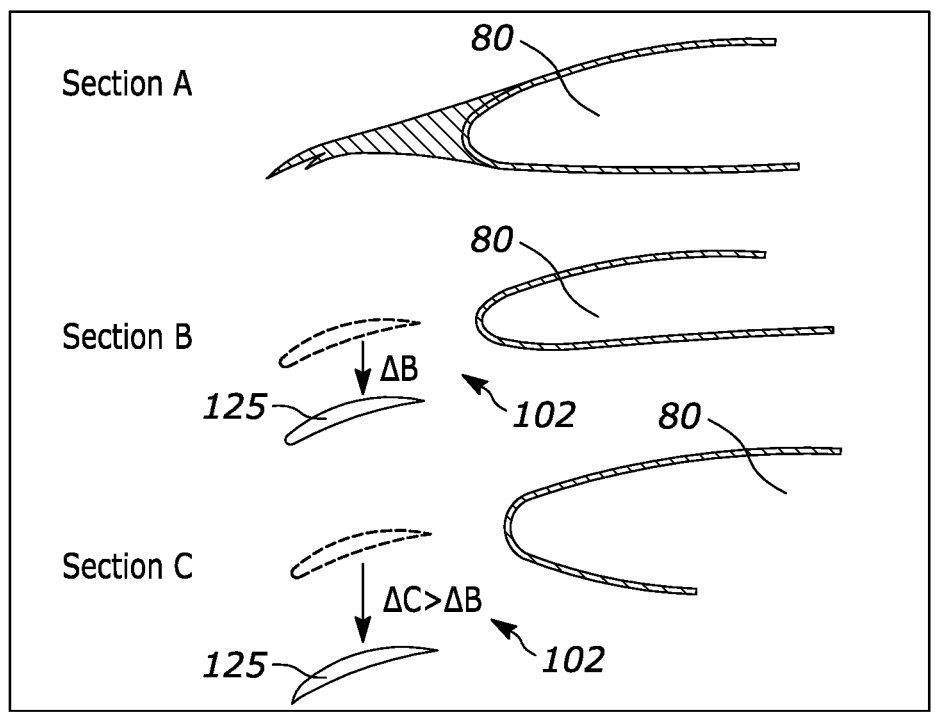
FIG. 4B is a series of cross-sectional views of the outlet guide vane shown in FIG. 4A according to some embodiments.
Figure 4C:
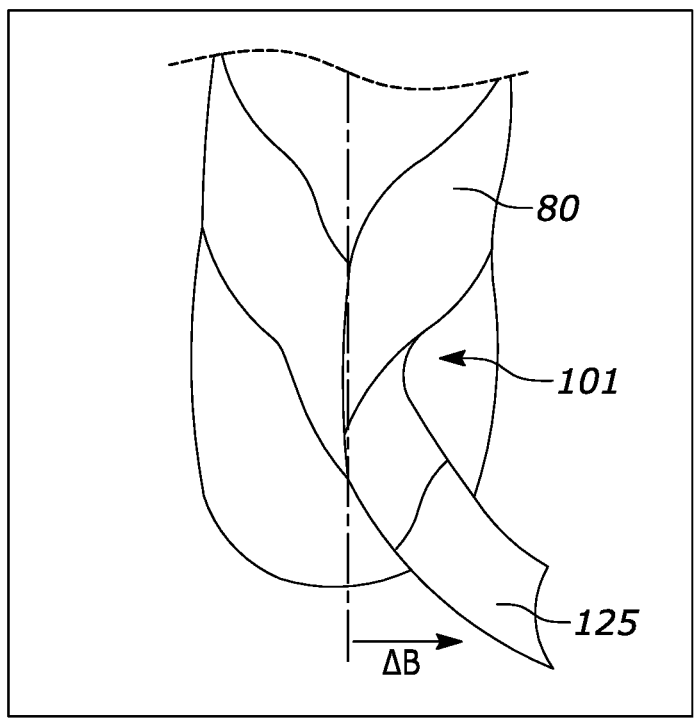
FIG. 4C is a perspective view of the outlet guide vane shown in FIG. 4A according to some embodiments.

In FIGS. 4A to 4C, a third embodiment of the cut-out outlet guide vane 101 is illustrated. The cut-out outlet guide vane 101 in FIGS. 4A to 4C includes a circumferentially leaned stacking 125 and is integrated with the pylon 80, as shown in FIG. 4C. The circumferentially leaned stacking 125 is created by the cut-out outlet guide vane 101 and may be placed along and/or coupled to the radially inward wall 44. The circumferentially leaned stacking 125 may extend substantially in the circumferential direction. In some embodiments, the circumferentially leaned stacking 125 extends, or points, from about 10° to 75° from the radially inward direction toward the circumferential direction. The circumferentially leaned stacking 125 allows for the benefits of reducing fan interaction noise by the cut-out outlet guide vane 101 described above with reference to FIG. 2. Additionally, the circumferentially leaned stacking 125 may provide the benefit of reducing fan interaction noise by protecting the leading edge of the pylon 80 from wakes emanating from the separate portion of the outlet guide vanes upstream. Because the cut-out 102 creates a void between the pylon 80, specifically the leading edge thereof, and its associated outlet guide vane, air passing through the bypass duct and contacting the cut-out outlet guide vane 101 upstream of the leading edge of the pylon can increase noise as the vane wake impinges on the pylon leading edge. By utilizing the circumferentially leaned stacking 125, this wake airflow can be redirected away from the leading edge of the pylon 80 avoiding the above described increased noise while concurrently allowing for the benefits of the cut-out outlet guide vane 101 described above. The circumferentially leaned stacking 125 may span a portion or the full radial length of the cut-out 102, and specifically the cut-out extent at a leading edge 114 of the cut-out 102.

As shown in FIG. 4B, the cut-out outlet guide vane 101 is coupled to the pylon 80 at and above line A shown in dashed lines in FIG. 4A. The cut-out outlet guide vane 101 is coupled to the pylon 80 until the conjunction 107, just above line B shown in dashed line in FIG. 4A. The cut-out 102 at line B may be smaller than the cut-out 102 at line C shown in dashed line in FIG. 4A due to the increase in size of the cut-out 102 near the hub, e.g., where the cut-out outlet guide vane 101 is attached to the radially inward wall 44. The cut-out 102 may be circumferentially placed along the radially inward wall 44 on either side of the pylon 80. Additionally, the amount of lean of the circumferentially leaned stacking 125 may vary.

Figure 5:
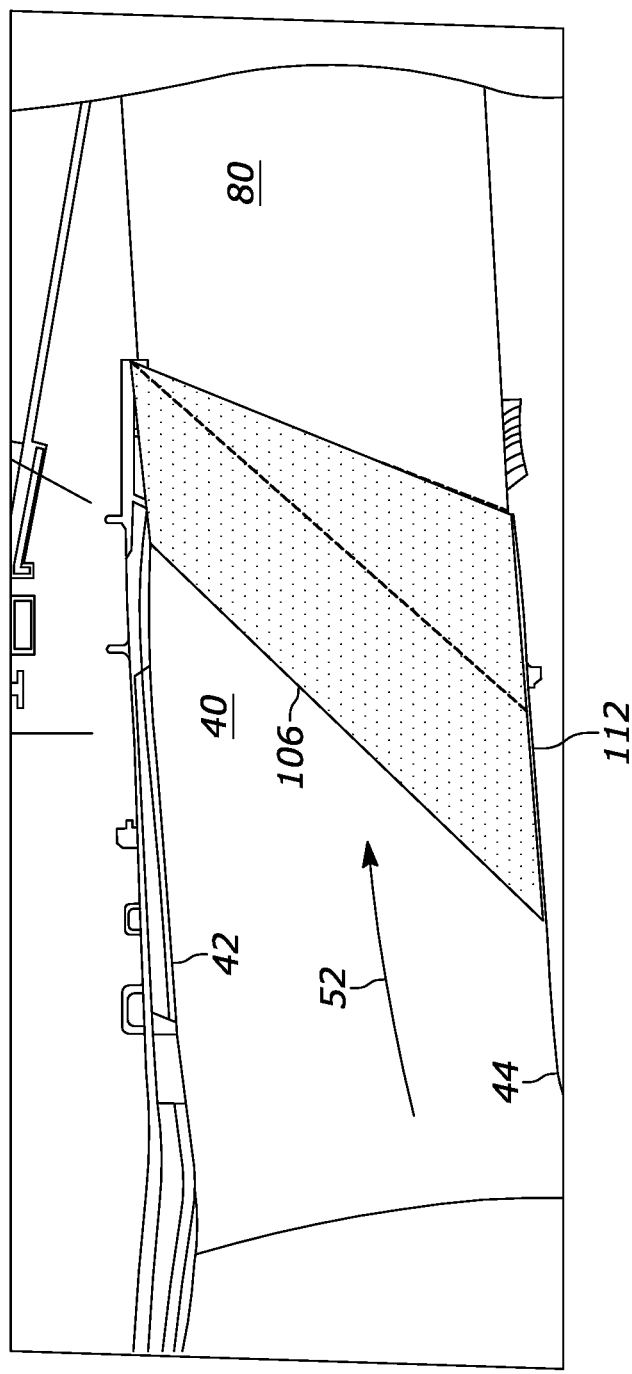
FIG. 5 is an elevational partial cross-sectional view of the turbofan engine shown in FIG. 1 including an outlet guide vane according to some embodiments.
Figure 6:
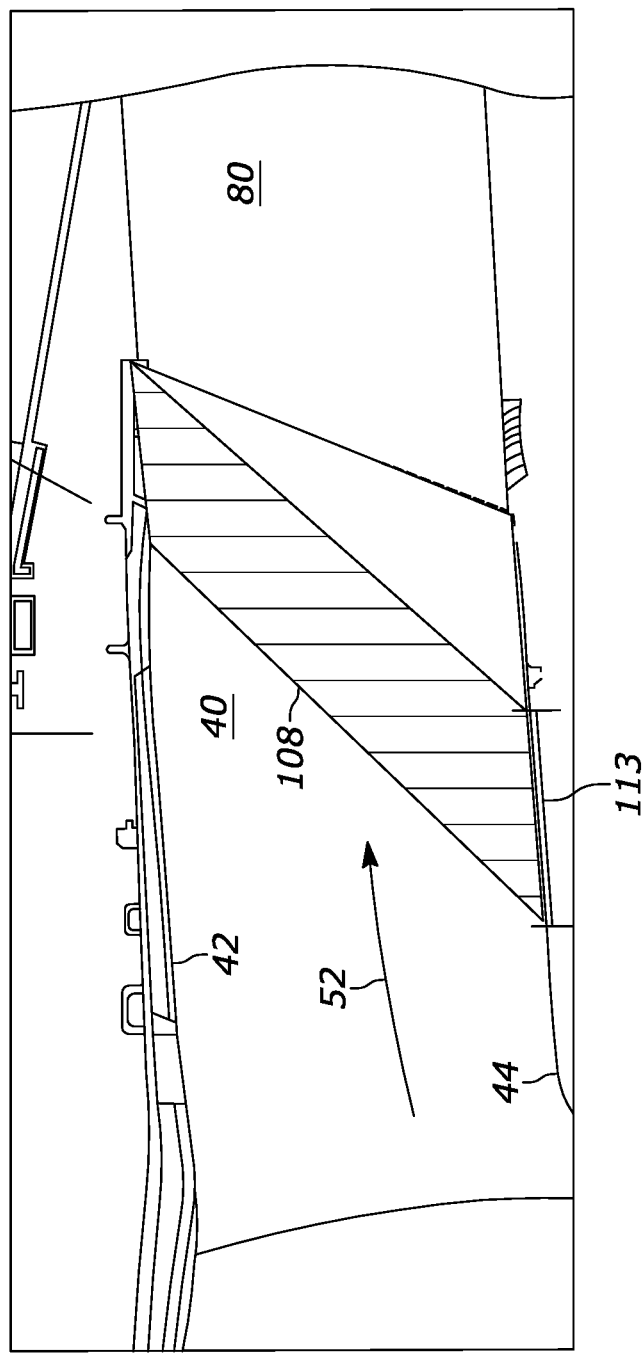
FIG. 6 is an elevational partial cross-sectional view of the turbofan engine shown in FIG. 1 including an outlet guide vane according to some embodiments.

Referring to FIGS. 5 and 6, solid structural and non-structural outlet guide vanes are illustrated. A solid structural outlet guide vane 106 is illustrated in FIG. 5. The solid structural outlet guide vane 106 may be integrated with the pylon 80. The solid structural outlet guide vane 106 provides the mechanical benefits described above along with the noise benefits of a high degree of leading edge sweep as also described above. The solid structural outlet guide vane 106 may have an increased chord length 112 due to the structural nature of the guide vane. A non-structural outlet guide vane 108 is illustrated in FIG. 6. The non-structural outlet guide vane 108 is typically not integrated with the pylon 80. The non-structural outlet guide vane 108 may have a reduced chord length 113 due to the non-structural nature of the guide vane. In instances where the non-structural outlet guide vane 108 is integrated with the pylon 80, the non-structural outlet guide vane 108 does not provide mechanical strength. The non-structural outlet guide vane 108 provides the benefits of having a shorter chord length and additionally provides the noise reduction due to the high degree of leading edge sweep as discussed above. In some embodiments, the outlet guide vanes in FIGS. 5 and 6 are conventional outlet guide vanes having known shapes and dimensions.

FIGS. 7A to 7D illustrate various exemplary outlet guide vane structures. These outlet guide vane structures utilize the plurality of non-uniform outlet guide vanes having varying chord lengths. Specifically, the cut-out outlet guide vane 101 may have a corresponding chord length, similarly the solid structural outlet guide vane 106 and the non-structural outlet guide vane 108 may have increased corresponding chord lengths. Due to the varying chord lengths, these three chord lengths may all be different. In some embodiments, only two of the chord lengths vary. The embodiments illustrated are examples of different outlet guide vane structures and are non-limiting examples. For instance, the cut-out outlet guide vane 101, the solid structural outlet guide vane 106, or the non-structural outlet guide vane 108 may be integrated with the pylon 80. In these instances, each of the outlet guide vanes may be considered structural outlet guide vanes.

Figure 7A:
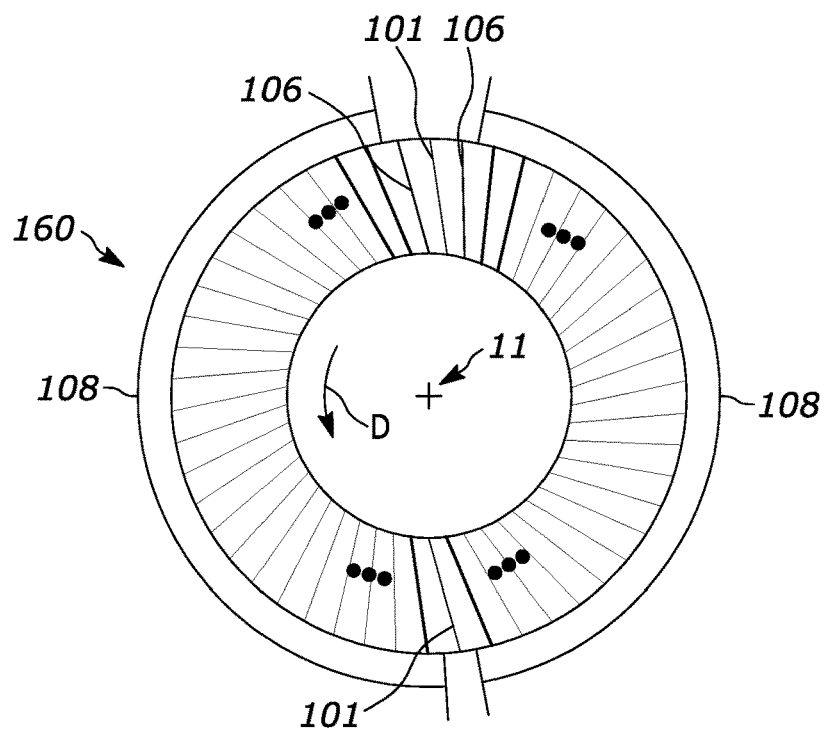
FIG. 7A is an elevational view of a guide vane assembly according to some embodiments.

Referring to FIG. 7A, a first example of a non-uniform outlet guide vane structure 160 is illustrated. The non-uniform outlet guide vane structure 160 includes both the pylon 80, as described above with reference to FIGS. 1-6, at the top of the non-uniform outlet guide vane structure 160, and the bifurcation 82, as described above with reference to FIG. 1, at the bottom of the non-uniform outlet guide vane structure 160. A cut-out outlet guide vane 101 is integrally formed with the pylon 80. Adjacent the cut-out outlet guide vane 101 integrally formed with the pylon 80, there is one or more solid structural outlet guide vane 106 on each side of the cut-out outlet guide vane 101. Additionally, there is a second cut-out outlet guide vane 101 integrated with the bifurcation 82, which may have neighboring structural vanes 106. The remainder of the vanes of the non-uniform outlet guide vane structures 160 are the non-structural outlet guide vane 108.

Figure 7B:
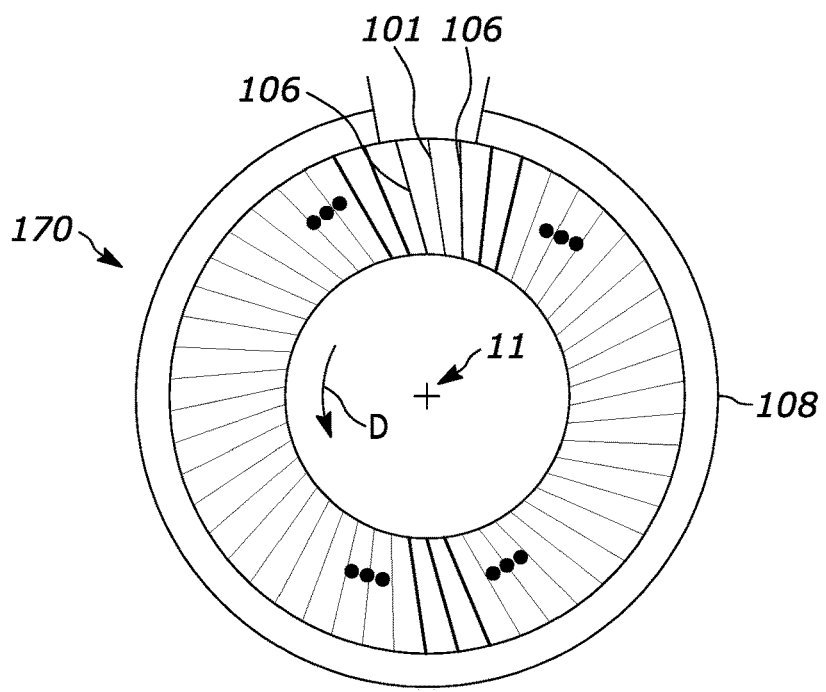
FIG. 7B is an elevational view of a guide vane assembly according to some embodiments.

Referring to FIG. 7B, a second example of a non-uniform outlet guide vane structure 170 is illustrated. The non-uniform outlet guide vane structure 170 includes a pylon 80, as described above with reference to FIGS. 1-6, at the top of the non-uniform outlet guide vane structure 170. Similar to FIG. 7A, a cut-out outlet guide vane 101 is integrally formed with the pylon 80. Adjacent the cut-out outlet guide vane 101 integrally formed with the pylon 80, there is one or more solid structural outlet guide vanes 106 on each side of the cut-out outlet guide vane 101. Additionally, while not illustrated, there may be solid structural outlet guide vanes 106 around the bottom section (6 o'clock) of the vane row. The remainder of the vanes of the non-uniform outlet guide vane structure 170 are the non-structural outlet guide vane 108.

Figure 7C:
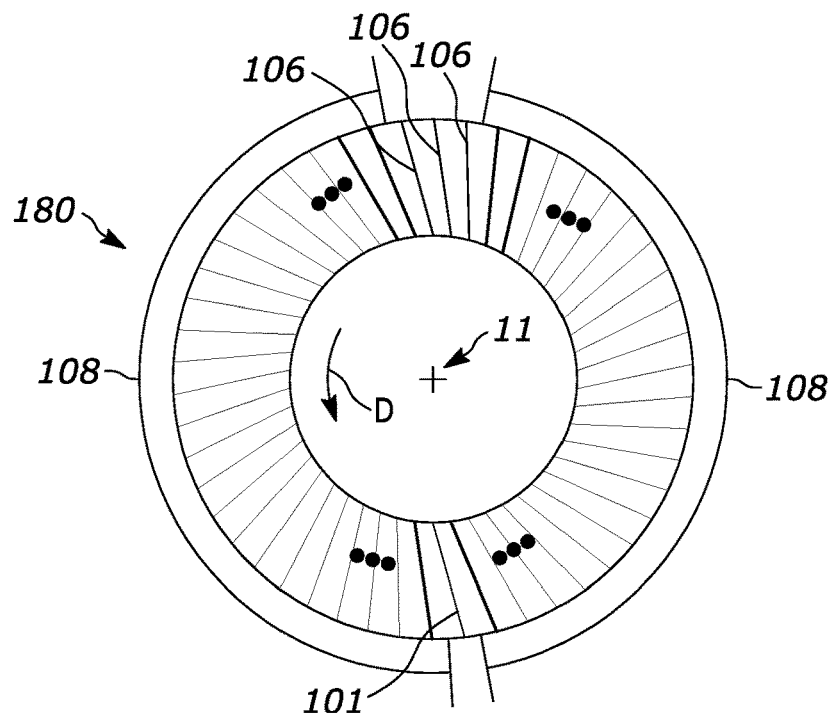
FIG. 7C is an elevational view of a guide vane assembly according to some embodiments.

Referring to FIG. 7C, a third example of a non-uniform outlet guide vane structure 180 is illustrated. The non-uniform outlet guide vane structure 180 includes both the pylon 80, as described above with reference to FIGS. 1-6, at the top of the non-uniform outlet guide structure 180, and the bifurcation 82, as described above with reference to FIG. 1, at the bottom of the non-uniform outlet guide structure 180. A solid structural outlet guide vane 106 is integrally formed with the pylon 80. Adjacent the solid structural outlet guide vane 106 integrally formed with the pylon 80, there is one or more solid structural outlet guide vanes 106 on each side of the integrally formed solid structural outlet guide vane 106. Additionally, there is a cut-out guide vane 101 integrated with the bifurcation 82 with one or more neighboring solid structural outlet guide vanes 106 on each side of the bifurcation integrated vane. The remainder of the vanes of the non-uniform outlet guide vane structure 180 are the non-structural outlet guide vane 108.

Figure 7D:
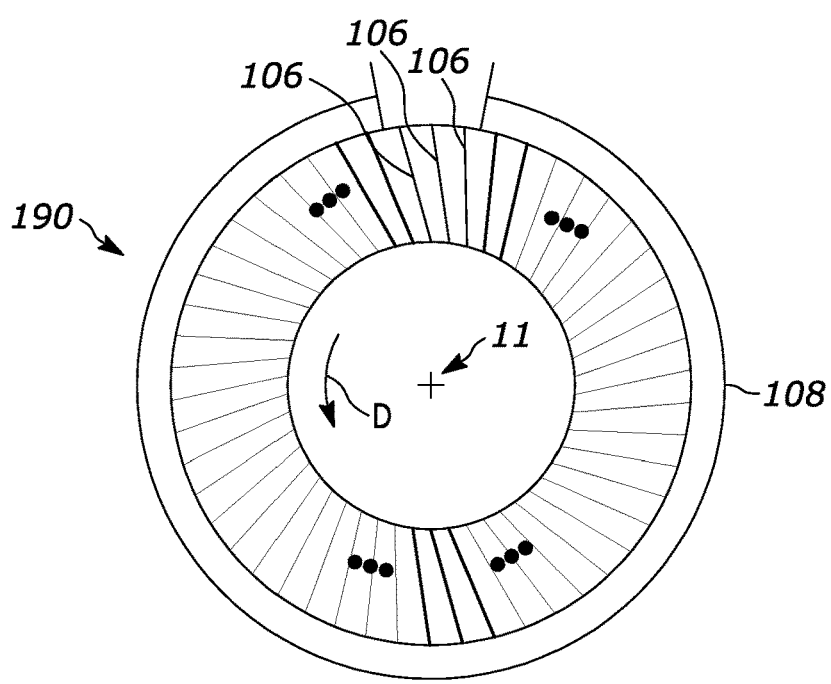
FIG. 7D is an elevational view of a guide vane assembly according to some embodiments.

Referring to FIG. 7D, a fourth example of a non-uniform outlet guide vane structure 190 is illustrated. The non-uniform outlet guide structure 190 includes a pylon 80, as described above with reference to FIGS. 1-6, at the top of the non-uniform outlet guide structure 190. Similar to FIG. 7C, a solid structural outlet guide vane 106 is integrally formed with the pylon 80. Adjacent the solid structural outlet guide vane 106 integrally formed with the pylon 80, there is one or more solid structural outlet guide vane 106 on each side of the integrally formed solid structural outlet guide vane 106. Additionally, while not illustrated, there may be solid structural outlet guide vanes 106 around the bottom section (6 o'clock) of the vane row. The remainder of the vanes of the non-uniform outlet guide vane structure 190 are the non-structural outlet guide vane 108.

While the above non-uniform outlet guide structures have been illustrated, the present disclosure contemplates several different configurations utilizing cut-out guide vanes 101, solid structural outlet guide vanes 106, and non-structural outlet guide vane 108. For example, non-uniform outlet guide structures including a single cut-out outlet guide vane 101 or a single solid structural outlet guide vane 106 integrated with the pylon with the remaining vanes being non-structural outlet guide vane 108 are contemplated.

Utilizing non-uniform outlet guide structures having at least two of the vane structures described above allows for the efficiency and noise reduction benefits while maintaining the mechanical strength needed. Specifically, the cut-out guide vanes 101 and solid structural outlet guide vanes 106 provide the benefits when integrated with or placed adjacent to the pylon 80 and/or the bifurcation 82. Utilizing the non-structural outlet guide vane 108 allows for increased efficiency by reducing the chord length while maintaining the noise reduction associated with the high degree of leading edge sweep. Because the non-structural outlet guide vanes 108 are non-structural they can have optimal chord lengths, sweeps, and leans without the need for mechanical support. For example, by utilizing the cut-out guide vanes 101 and the solid structural outlet guide vanes 106 only integrated with and/or adjacent to the pylon 80 and/or the bifurcation 82, the non-uniform outlet guide structure may utilize the efficient non-structural outlet guide vane 108 and provide the structure where needed, i.e., around the pylon 80 and the bifurcation 82.

Figure 8:
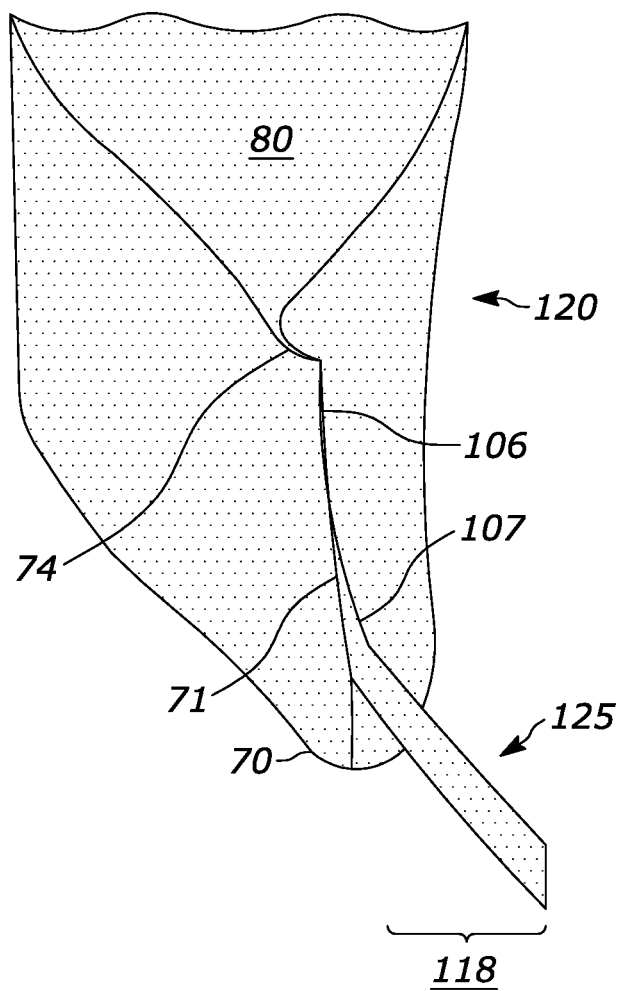
FIG. 8 is a perspective view of a guide vane according to some embodiments.

Referring to FIG. 8, a solid structural outlet guide vane 106 integrated with a pylon 80 having an acoustic liner 120 disposed within the solid structural outlet guide vane 106 and the pylon 80 is illustrated. The acoustic liner 120 may be disposed on, coupled to, inside of, or within the solid structural outlet guide vane 106 and the pylon 80. Additionally, the liner 120 may be disposed on, coupled to, inside of, or within the cut-out outlet guide vane 101, the non-structural outlet guide vane 108, as described above with reference to FIGS. 2-4C, and/or the bifurcation 82, as described above with reference to FIG. 1. The acoustic liner 120 may include a textured or patterned surface to redirect the passing air, and in turn, provide additional noise reduction, such as drag reduction, of the non-uniform outlet guide structures. The acoustic liner 120 may be, for example, a sheath of textured metal disposed on, coupled to, inside of, or within the vanes.

For example, the outlet guide vanes may include a plurality of cavities disposed within the outlet guide vanes, each of the plurality of cavities having an inlet located at a leading edge of the outlet guide vane. The outlet guide vane may generally include a porous face sheet, the acoustic liner 120, positioned on at least one inlet of the plurality of cavities. The outlet guide vane with the porous face sheet positioned on at least one inlet of the plurality of cavities may allow for noise reduction. Additionally, the outlet guide vane including the acoustic liner 120 may provide for reduced wake-vane interaction noise of the turbofan engine 10.

The porous face sheet may be a perforated surface of the outlet guide vane, such as a microperforated surface. The porous face sheet may be a separate component and is placed, such as bonded, on an outer surface of the outlet guide vane. However, in some examples, the porous face sheet may be disposed within the outlet guide vane such that the porous face sheet is flush to the outer surface of the outlet guide vane. In yet other examples, the porous face sheet is monolithic with at least a portion the outlet guide vane. For example, the porous face sheet can be formed integrally with the outlet guide vane by laser drilling, additive manufacturing, etc. In yet other examples, the porous face sheet is a perforated metal leading edge member. The face sheets, cavities, inlets, surfaces, outlets, and other structures can be the same or similar to those described in U.S. application Ser. No. 17/828,112, filed on May 24, 2022, which is hereby incorporated by reference in its entirety.

Still referring to FIG. 8, the circumferentially leaned stacking 125, similar to FIG. 4B at section B and C, of the pylon integrated vane with the cutout feature described above in FIGS. 4A to 4C is illustrated. The circumferentially leaned stacking 125 extends a circumferential distance 118 at the base of the cut-out outlet guide vane 101 along the radially inward wall 44, as described above with reference to FIGS. 1-4A and 5-6. The circumferentially leaned stacking 125 extends in the circumferential direction starting from the conjunction 107 and circumferentially spans to the base, or the radially inward wall 44. The circumferential distance 118 varies spanwise and depends on the size of the cut-out 102, as described above with reference to FIGS. 2-4B, of the cut-out outlet guide vane 101.

Figure 9:
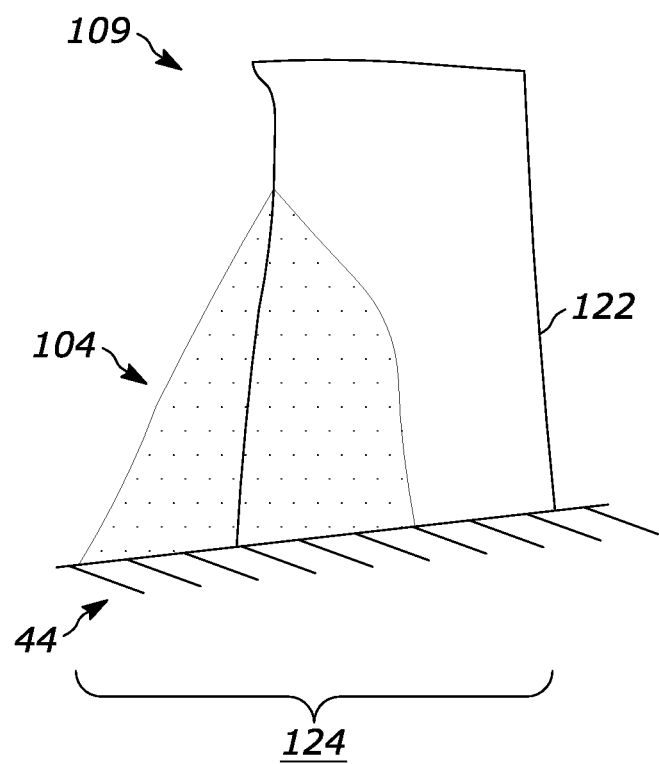
FIG. 9 is a perspective view of a guide vane according to some embodiments.

Referring to FIG. 9, an exemplary outlet guide vane 122 with a reverse or forward sweep 109 is illustrated. The exemplary outlet guide vane 122 includes a chord length 124 at the base of the exemplary outlet guide vane 122, i.e., where the exemplary outlet guide vane 122 is coupled to the radially inward wall 44. The exemplary outlet guide vane 122 includes the sweep 104. The exemplary outlet guide vane 122 additionally includes the reverse or forward sweep 109 at the tip of the exemplary outlet guide vane 122, i.e., where the exemplary outlet guide vane 122 couples to the radially outward wall 42, as described above with reference to FIGS. 1-4A and 5-6. In some embodiments, one or more of the outlet guide vanes 101, 106, and 108, as described above with reference to FIGS. 2-6, may include a reverse or forward sweep 109 to provide the benefits outlined above of improved efficiency and noise reduction while maintaining mechanical strength.

Further aspects of the disclosure are provided by the subject matter of the following clauses:

A turbofan engine including outlet guide vanes including: a bypass duct having a radially inward wall and a radially outward wall; and a plurality of non-uniform outlet guide vanes disposed between the radially inward wall and the radially outward wall of the bypass duct, wherein the plurality of non-uniform outlet guide vanes includes at least one first integral outlet guide vane coupled to a pylon of the turbofan engine, and wherein chord lengths of two or more of the plurality of non-uniform outlet guide vanes at a base adjacent the radially inward wall are different.

The turbofan engine of any preceding clause, further including at least one bifurcation, wherein the plurality of non-uniform outlet guide vanes further includes least one second integral outlet guide vane coupled to the at least one bifurcation.

The turbofan engine of any preceding clause, wherein the at least one first integral outlet guide vane further includes a cut-out at a base of the at least one first integral outlet guide vane adjacent the radially inward wall of the bypass duct.

The turbofan engine of any preceding clause, wherein the cut-out extends about 10% to 90% of a radial length of the at least one first integral outlet guide vane measured from the base of the at least one first integral outlet guide vane toward the radially outward wall, wherein the radial length extends from the radially inward wall toward the radially outward wall.

The turbofan engine of any preceding clause, wherein the at least one first integral outlet guide vane integrated with the pylon further includes a lean at the base of the at least one first integral outlet guide vane.

The turbofan engine of any preceding clause, wherein each of the plurality of non-uniform outlet guide vanes further includes a lean at a leading edge, wherein the lean is uniform for each of the plurality of non-uniform outlet guide vanes.

The turbofan engine of any preceding clause, further including an acoustic liner disposed on, coupled to, inside of, or within one or more of the plurality of non-uniform outlet guide vanes or the pylon.

The turbofan engine of any preceding clause, wherein the plurality of non-uniform outlet guide vanes includes at least one cut-out outlet guide vane integrally coupled with the pylon and the at least one first integral outlet guide vane disposed adjacent to the at least one cut-out outlet guide vane.

The turbofan engine of any preceding clause, wherein a cut-out of the at least one cut-out outlet guide vane is disposed at a base of the at least one cut-out outlet guide vane adjacent the radially inward wall.

The turbofan engine of any preceding clause, wherein the cut-out extends about 10% to 90% of a radial length of the at least one cut-out outlet guide vane measured from the base of the at least one cut-out outlet guide vane toward the radially outward wall, wherein the radial length extends from the radially inward wall toward the radially outward wall.

The turbofan engine of any preceding clause, wherein the cut-out extends between about 1% to 99% from the radially inward wall toward the radially outward wall.

The turbofan engine of any preceding clause, wherein the cut-out of the at least one cut-out outlet guide vane further includes a circumferential lean at the base of the at least one cut-out outlet guide vane.

The turbofan engine of any preceding clause, wherein the plurality of non-uniform outlet guide vanes includes a leading edge that extends to a splitter of the radially inward wall.

The turbofan engine of any preceding clause, wherein the plurality of non-uniform outlet guide vanes includes a leading edge that extends between 1% to 100% from a splitter of the radially inward wall to a leading edge of the pylon.

The method/system of any preceding clause, an outlet guide vane structure including: a cut-out outlet guide vane coupled to a pylon of a turbofan engine; and a cut-out of the cut-out outlet guide vane extending axially from a base of the cut-out outlet guide vane at a radially inward wall of a bypass duct toward a radially outward wall of the bypass duct.

An outlet guide vane structure, wherein the cut-out extends about 10% to 90% of a radial length of the cut-out outlet guide vane toward the radially outward wall, wherein the radial length extends from the radially inward wall toward the radially outward wall.

The outlet guide vane structure of any preceding clause, wherein the cut-out outlet guide vane includes a circumferential lean at the base of the cut-out outlet guide vane.

The outlet guide vane structure of any preceding clause, further including an acoustic liner disposed on, coupled to, inside of, or within the cut-out outlet guide vane.

The outlet guide vane structure of any preceding clause, wherein the cut-out outlet guide vane includes a sweep.

The outlet guide vane structure of any preceding clause, wherein the cut-out extends between about 1% to 99% from the radially inward wall toward the radially outward wall.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A turbofan engine including outlet guide vanes comprising: a bypass duct having a radially inward wall and a radially outward wall; and a plurality of non-uniform outlet guide vanes disposed between the radially inward wall and the radially outward wall of the bypass duct, wherein the plurality of non-uniform outlet guide vanes includes at least one first integral outlet guide vane coupled to a pylon of the turbofan engine, wherein chord lengths of two or more of the plurality of non-uniform outlet guide vanes at a base adjacent the radially inward wall are different, wherein the plurality of non-uniform outlet guide vanes includes the at least one first integral outlet guide vane, at least one structural outlet guide vane, at least one cut-out outlet guide vane, and at least one non-structural outlet guide vane.

2. The turbofan engine of claim 1, further comprising at least one bifurcation, wherein the plurality of non-uniform outlet guide vanes further includes at least one second integral outlet guide vane coupled to the at least one bifurcation.

3. The turbofan engine of claim 1, wherein the at least one first integral outlet guide vane further comprises a cut-out at a base of the at least one first integral outlet guide vane adjacent the radially inward wall of the bypass duct.

4. The turbofan engine of claim 3, wherein the cut-out extends about 10% to 90% of a radial length of the at least one first integral outlet guide vane measured from the base of the at least one first integral outlet guide vane toward the radially outward wall, wherein the radial length extends from the radially inward wall toward the radially outward wall.

5. The turbofan engine of claim 3, wherein the at least one first integral outlet guide vane integrated with the pylon further comprises a leaned stacking at the base of the at least one first integral outlet guide vane.

6. The turbofan engine of claim 1, wherein each of the plurality of non-uniform outlet guide vanes further comprises a lean at a leading edge, wherein the lean is uniform for each of the plurality of non-uniform outlet guide vanes.

7. The turbofan engine of claim 1, further comprising an acoustic liner disposed on, coupled to, inside of, or within one or more of the plurality of non-uniform outlet guide vanes or the pylon.

8. The turbofan engine of claim 1, wherein at least one cut-out outlet guide vane is integrally coupled with the pylon and the at least one structural outlet guide vane is disposed adjacent to the at least one cut-out outlet guide vane.

9. The turbofan engine of claim 8, wherein a cut-out of the at least one cut-out outlet guide vane is disposed at a base of the at least one cut-out outlet guide vane adjacent the radially inward wall.

10. The turbofan engine of claim 9, wherein the cut-out extends about 10% to 90% of a radial length of the at least one cut-out outlet guide vane measured from the base of the at least one cut-out outlet guide vane toward the radially outward wall, wherein the radial length extends from the radially inward wall toward the radially outward wall.

11. The turbofan engine of claim 9, wherein the cut-out extends between about 1% to 99% from the radially inward wall toward the radially outward wall.

12. The turbofan engine of claim 9, wherein the cut-out of the at least one cut-out outlet guide vane further comprises a circumferential lean at the base of the at least one cut-out outlet guide vane.

13. The turbofan engine of claim 1, wherein the plurality of non-uniform outlet guide vanes includes a leading edge that extends to a splitter of the radially inward wall.

14. The turbofan engine of claim 1, wherein the plurality of non-uniform outlet guide vanes includes a leading edge that extends between 1% to 100% from a leading edge of the pylon towards a splitter of the radially inward wall.

15. The turbofan engine of claim 1, wherein the at least one structural outlet guide vane is the at least one first integral outlet guide vane.

16. The turbofan engine of claim 15, wherein the at least one cut-out outlet guide vane is adjacent to the at least one structural outlet guide vane.

17. The turbofan engine of claim 15, wherein two cut-out outlet guide vanes are on each side of the at least one structural outlet guide vane.

18. The turbofan engine of claim 15, wherein two structural outlet guide vanes are on each side of the at least one cut-out outlet guide vane.

19. The turbofan engine of claim 1, wherein the at least one cut-out outlet guide vane is the at least one first integral outlet guide vane.

20. The turbofan engine of claim 19, wherein the at least one structural outlet guide vane is adjacent to the at least one cut-out outlet guide vane.

\* \* \* \* \*